United States Patent

[11] 3,625,920

| [72] | Inventor | Jan Borkowski |
| | | Warszawa, Poland |
| [21] | Appl. No. | 726,544 |
| [22] | Filed | May 3, 1968 |
| [45] | Patented | Dec. 7, 1971 |
| [73] | Assignee | Instytut Tworzyw Sztucznych Warszawa, UL. |
| | | Rydygiera, Poland |
| [32] | Priority | May 5, 1967 |
| [33] | | Poland |
| [31] | | 120,392 |

[54] PROCESS FOR THE PRODUCTION OF CARBONIC ACID POLYESTERS
8 Claims, No Drawings

[52] U.S. Cl. .................................................. 260/47,
252/429, 252/432, 260/45.7
[51] Int. Cl. ........................................................ C08g 17/13

[50] Field of Search ............................................. 260/47 X, 75 H

[56] References Cited
UNITED STATES PATENTS

| 3,083,182 | 3/1963 | Matsukane et al............ | 260/47 |
| 3,153,008 | 10/1964 | Fox ............................... | 260/47 |

FOREIGN PATENTS

| 1,470,816 | 1/1967 | France ........................ | 260/47 |

Primary Examiner—Samuel H. Blech
Attorney—Irvin A. Lavine

ABSTRACT: Process for producing polycarbonate by transesterification reaction between aromatic monohydroxycarbonic ester and dihydroxy diphenyl alkane or phenol adduct thereof in presence of alkali metal salt of fluoroboric acid and/or hydroxyfluoroboric acid as catalysts and stabilizers.

PROCESS FOR THE PRODUCTION OF CARBONIC ACID POLYESTERS

The known process for producing carbonic acid polyesters or polycarbonates is based on ester interchange between carbonic acid esters and aromatic dihydroxyl diphenyl alkanes. The process is carried out at the elevated temperature 180°–300° under gradually diminished pressure. It is known that the reaction is accelerated by using such catalysts as for example alkali metal oxides and their weak organic acid salts, heavy metal oxides and their weak acid salts, as well hydrides, alkoxides and phenoxides of alkali metals especially sodium.

The major defect of above-mentioned catalysts is that after completion of the synthesis process, the catalysts remain in the final-product and cause its destruction due to cross-linking and other changes during the thermal processing of the product.

Reaction in which the basic compounds of alkali metals used as catalysts have to be neutralized for instance by means of dimethyl sulfate are difficult to perform due to high viscosity of the melted reaction product.

According to the invention convenient catalysts for transestrification process of carbonic acid esters with aromatic dihydroxy diphenyl alkanes are the salts of fluoroboric acid or hydroxy fluoroboric acids with alkali metal such as lithium, sodium, potassium and rubidium. They have the advantage that the neutralization of the catalysts after the completion of the synthesis process is not necessary. They do not produce undesirable color in the final product, but rather stabilize it, and being sufficient soluble do not cause opalescence or opacity of the final product.

The fluoroborates or hydroxyfluoroborates can be introduced with the raw products as well by applying suitable substances form them during the transestrification process. For this purpose fluorides of alkali metals and boric acid are especially convenient. It is established that for instance sodium fluoride as well boric acid do not reveal suitable catalytic properties when applied separately; when used together in convenient stoichiometric relations it occurs the adequate catalytic effect.

As catalysts the mixture of fluoroborates or hydroxyfluoroborates of various alkali metals can be used. In this case in the mixture of the chloride of alkali can be used as well, for instance sodium tetrafluoroborate and lithium chloride.

The mentioned catalysts can be applied in the mixture with arylsilanes, arylalkylsilanes, alkylarylalkoxysilanes or arylalkoxysilanes which have been previously disclosed as catalysts for preparing policarbonates by transestrification process.

EXAMPLE 1

Two hundred twenty eight grams of 44 dihydroxy diphenylpropane, 235 g. of diphenyl carbonate and 0.2 g. of sodium fluoroborate are melted while stirring in an atmosphere of an inert gas, at a temperature of about 110° to 130°. Subsequently phenol is distilled off under a pressure of 50 to 70 mm. Hg. at a temperature of about 170°–210° during 1 hour period.

Then temperature is raised to 300° and phenol with the excess of diphenyl carbonate are distilled off under a pressure below 1 mm. Hg. During the polycondensation process which lasts about 6 hours the reaction mass is thickened. The obtained polycarbonate has an intrinsic viscosity in chloroform of 0.6 and a melt flow index at 250° CP–5 kh–3g./ /10 min. /ASTM–D247366T/

EXAMPLE 2

The procedure given in example 1 was repeated using 0.2 of tetraphenylsilane and 0.1 g. of sodium fluoroborate as catalysts. The obtained polycarbonate has an intrinsic viscosity in chloroform 0.6

EXAMPLE 3

The procedure given in example 1 was repeated using 0.2 of tetraphenylsilane and 0.05 g. of potassium hydrofluoroborates as catalysts. The obtained polycarbonate has an intrinsic viscosity in chloroform 0.6

EXAMPLE 4

The procedure given in example 1 was repeated using 0.2 g. of tetraphenylsilane and 0.1 g. of rubidium fluoroborate as catalysts. The obtained polycarbonate has an intrinsic viscosity in chloroform 0.6

EXAMPLE 5

The procedure given in example 1 was repeated using 0.2 g. of tetraphenylsilane, 0.1 g. of sodium fluoroborate and 0.05 of lithium chloride. The obtained polycarbonate has an intrinsic viscosity in chloroform 0.6

Example 6

Phenol adduct of 4,4-dihydroxy-diphenylpropane in an amount equivalent to 228 g. of dihydroxy compound, 235 g. of diphenyl carbonate and 0.2 g. of sodium fluoroborate are melted at a temperature of 90°–110° C. in an atmosphere of an inert gas and subsequently distilled off the phenol from the adduct at a temperature of 140° to 160°. Phenol obtained from the transestrification process is distilled off at a temperature of 170°–210°. After 1 hour the temperature is gradually raised to 280° and phenol with the excess of diphenyl carbonate are distilled off under a pressure below 1 mm. Hg.

During the polycondensation process which lasts about 6 hours the reaction mass is thickened. The obtained polycarbonate has an intrinsic viscosity in chloroform 0.6 and a melt-flow index at 250° CP–5 kg. 3g./10 min. /ASTM–D2473–66T/

EXAMPLE 7

The procedure given in example 6 was repeated using 0.2 g. of tetraphenylsilane and 0.05 g. of potassium hydroxyfluoroborate as catalysts.

The obtained polycarbonate has an intrinsic viscosity in chloroform 0.6

EXAMPLE 8

The procedure given in example 6 was repeated using 0.2 g. of tetraphenylsilane, 0.04 g. of sodium fluoride and 0.06 of boric acid, as catalysts. The obtained polycarbonate has an intrinsic viscosity in chloroform 0.6

EXAMPLE 9

The procedure given in example 6 was repeated using 0.2 g. of tetraphenylsilane, 0.01 g. of sodium fluoroborate and 0.06 g. lithium chloride as catalysts. The obtained polycarbonate has an intrinsic viscosity in chloroform 0.6

What we claim is:

1. A process for producing polycarbonate by effecting a transesterification reaction between an aromatic monohydroxycarbonic ester and a compound selected from the group consisting of a dihydroxy diphenyl alkane and adduct thereof with phenol in the presence of a catalyst and stabilizer selected from the group consisting of alkali metal salt of fluoroboric acid, alkali metal salt of hydroxyfluoroboric acid and mixtures thereof, said reaction being carried out at elevated temperature in an atmosphere of an inert gas and during said reaction phenol is distilled off under vacuum and residual polycarbonate is recovered.

2. A process for producing polycarbonate according to claim 1 wherein said catalyst and stabilizer is a fluoroboric acid salt of an alkali metal selected from the group consisting of lithium, sodium, potassium, and rubidium which is present in an amount of up to 1 percent by weight based upon the amount of said compound.

3. A process for producing polycarbonate according to claim 1 wherein said catalyst and stabilizer is an hydroxyfluoroboric acid salt of an alkali metal selected from the group consisting of lithium, sodium, potassium and rubidium which is present in an amount up to 1 percent based upon the amount of said compound.

4. A process for producing polycarbonate according to claim 1 wherein up to 1 percent by weight based upon the amount of said compound of a fluoride of an alkali metal selected from the group consisting of lithium, sodium, potassium and rubidium and boric acid is present, which produces said catalyst and stabilizer under the reaction conditions.

5. A process for producing polycarbonate according to claim 1 wherein the alkali metal of the salt of said catalyst and stabilizer is selected from the group consisting of lithium, sodium, potassium and rubidium and said catalyst and stabilizer is combined with an alkali metal chloride and the amount present of said catalyst and stabilizer and said alkali metal chloride is up to 1 percent by weight based upon the amount of said compound.

6. A process for producing polycarbonate according to claim 1 wherein said catalyst and stabilizer is a mixture of said alkali metal salt of fluoroboric acid and said alkali metal salt of hydroxyfluoroboric acid.

7. A process for producing polycarbonate according to claim 1 wherein said catalyst and stabilizer is combined with tetraphenylsilane and said catalyst and stabilizer and said tetraphenylsilane are present in an amount up to 1 percent by weight based upon the amount of said compound.

8. A process for producing polycarbonate according to claim 1 wherein said compound is a phenol adduct of a dihydroxy diphenyl alkane.

* * * * *